May 29, 1962  P. MAUBORGNE  3,036,789
SPINNING REEL

Filed May 27, 1959  2 Sheets-Sheet 1

Inventor
P. Mauborgne
By Glascock Downing Seebold
Attys.

May 29, 1962 P. MAUBORGNE 3,036,789
SPINNING REEL
Filed May 27, 1959 2 Sheets-Sheet 2
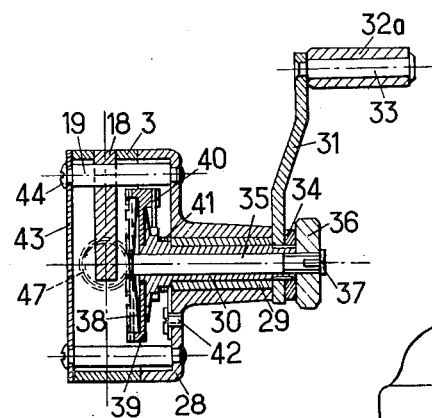
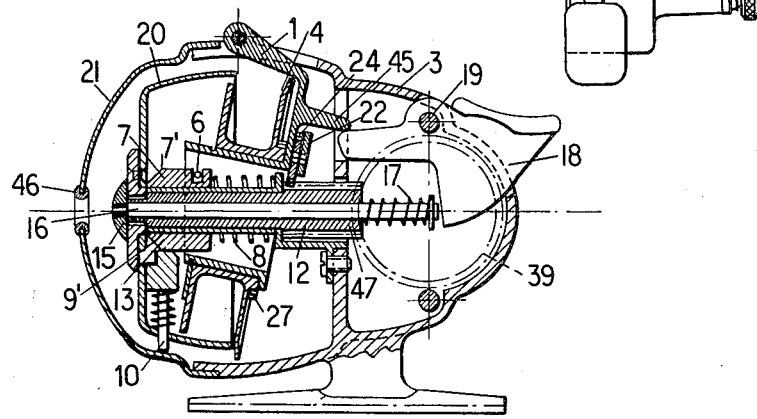
Inventor
P. Mauborgne
By Glascock Downing Seibold
Attys.

United States Patent Office 3,036,789
Patented May 29, 1962

3,036,789
SPINNING REEL
Paul Mauborgne, Bernouville, France
Filed May 27, 1959, Ser. No. 816,207
Claims priority, application France June 9, 1958
6 Claims. (Cl. 242—84.21)

The invention relates to a spinning reel in which the spool spindle is parallel to the fishing rod at least during the casting operation, so that the line can unwind freely without rotation of the spool.

With reels of this type, the line must be wound with as even a distribution as possible on the spool. To accomplish such a result, numerous solutions have been proposed in which means have been used to effect relative translational movement of the pick-up with respect to the spool, to an oscillating movement of one of these two components relative to the other, or also to a relative rotational movement of such two components about two distinct axes disposed at an angle to each other, as shown, for example, in French Patent No. 889,493, and British Patent No. 581,493.

The latter solution, which is described, for example, in French Patent No. 894,624, effects a pattern of crossed windings known as a "honeycomb" pattern, but the angular relationship of the spindles constitutes a serious drawback when the pick-up is disposed on the delivery side of the spool, and no satisfactory solution has heretofore been proposed.

An object of the present invention is to provide an improvement over the prior art as represented by such patent, which will permit the location of the pick-up on the delivery side of the spool, while securing the line to be wound in the "honeycomb" pattern.

To achieve such ends, the invention includes means for providing variation of the angle between the two axes of rotation, so that the latter may be made coincident for the casting operation, and inclined respecting each other for the winding-in operation.

An embodiment of the invention is described hereinafter, it being clearly understood that the scope of the invention is not to be limited to the precise features disclosed in the embodiment selected for the purpose of illustration.

In the drawings:

FIG. 3 is a cross-sectional view taken through the axis of the hand crank;

FIG. 4 is a cross-sectional view similar to that of FIG. 1, but with the spool being shown in the winding-in position, and FIG. 5 is a plan view with the rotational axis of the pick-up and the hand crank being in the plane of the figure, and the hand crank being omitted.

Figure 1:
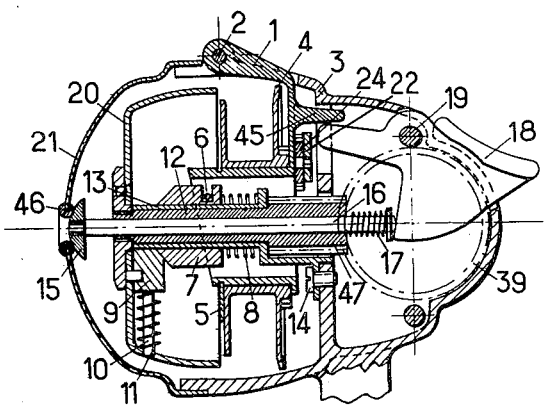
FIG. 1 is a diagrammatic cross-sectional view taken through the axis of rotation of the pickup, with the spool being shown in the pre-casting position.

In the drawings, a spool is indicated 4 and a flyer 20 holding the pick-up, and the line is not illustrated. The spool is mounted on a spool-holder formed as a hollow cylinder mounted on a base or spool holder 1, with the base being pivotable about a spindle 2, which spindle is perpendicular to the plane of the figure, and integral with a casing 3. The spool 4 is retained in translational movement on the spool-holder by a catch 5 cooperable with a circular groove in the spool-holder whereby the spool is capable of rotation relative to the spool-holder.

A push member 18 pivotable about a spindle 19 mounted in the casing 3 is adapted to act on a shank or extension 45 provided on the base 1, and thereby effect a tilting movement of the spool-holder about the spindle 2.

The flyer or pick-up 20 is in the form of a shell located forwardly of the spool 4, and is carried by a hollow shaft 12 capable of rotation within a sleeve bearing 13. One end of the shaft 12 is formed as a pinion 47, as shown in FIG. 1.

A cam member 7 is slidable on the sleeve bearing 13, and the front end of such member is conically shaped as as 7'. A spring means 8 tends to urge the cam member 7 to the left (FIG. 1), and the cam member is connected with the spool holder by means of a cross stud 6 engageable in a slot or cut-out portion provided in the member 7. This particular arrangement allows limited movement of the cam member 7 and the spool holder relative to each other.

A chock 9 mounted on the pick-up and capable of radial movement is provided with a surface 9' having the same degree of angularity as portion 7' of the cam member. This angularity is so correlated that when the spool is at rest, the thrust of the cam member due to the spring means 8 is not sufficient for displacing the chock 9, which is acted upon by spring means 11. Such displacement is possible when relative rotation is effected between cam member 7 and chock 9. The cam member can then displace the chock radially outward, and move forward until such member abuts against the flyer 20. In other words, when the spool is at rest, the static friction is such that the chock 9 cannot be displaced radially, but when the flyer rotates, the moving friction being less than the static friction, thereby enables such radial displacement.

The pick-up pin 10, per se, which is carried by the chock 9 is so arranged that the pick-up pin can protrude through an aperture provided in the flyer 20.

A cover 21 is located forwardly on the casing 3, and is formed with a central aperture therein for the passage of the line. The aperture is lined with an O-ring 46 for preventing abrasion of the line. A line arrester 15 which is formed as a mushroom head is mounted on one end of a rod 16 positioned for sliding movement within the hollow shaft 12, while the other end protrudes beyond the end face of the pinion 47. The protruding end of the rod is adapted to be acted upon by the push member 18 which causes the line arrester to bear against the O-ring 46. A spring means 17 located between the end face of the pinion 47 and a collar fixed on the rod 16 tends to urge the rod from left to right (FIG. 1) when the push member does not act upon the rod.

Figure 2:
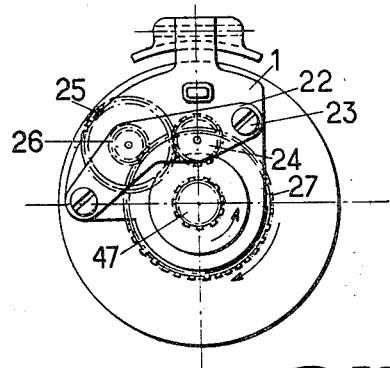
FIG. 2 is a view of the spool-holder viewed from the base end corresponding to the position shown in FIG. 1.

The back of the base 1 supports a loosely mounted gear wheel 24, which in the position illustrated in FIG. 4, meshes with the pinion 47 and transmits the drive to a gear wheel 27 on the spool 4 through reduction gears 25 and 26, and the gear wheel 24 are retained by means of a back plate 22 (FIG. 2) which may be secured to the base 1 by screws 23 or other affixing means.

FIG. 3 shows the drive unit in which a crown gear 39 which meshes with the pinion 47 is friction mounted on face plate spindle 30, and the spindle is mounted in bush 29. The same is retained against the face plate by pressure which can be adjusted by means of spring 38, rod 35 and an adjusting knob or nut 36. A rivet 37 holds the knob in place on the rod 35, and hand crank 31—32a—33 is secured to the spindle 30 by a lock nut 34. A non-return, flat, spiral spring 41 is secured to casing 28 by a screw 42 and functions to prevent backward rotation of the hand crank.

A pawl 40 for producing sound is attached to the crown gear 39, and cooperates with ratchet teeth formed in the back of the face plate for spindle 30, and the purpose of such arrangement is to warn the operator if the crown gear 39 slips between the spring 38 and the face plate.

The casing 28 together with its component parts is attached to the casing 3 by studs 19 and screws 44, and one of the studs functions as a spindle for the push member 18 as clearly shown in FIG. 3.

The operation of the reel is as follows:

In the position shown in FIG. 1, the line (not illustrated) is wound onto the spool, and the free end passes around the flyer 20 and projects through the central aperture of the cover 21. In this position, the line is held between the line arrester 15 and the O-ring 46, thereby preventing inadvertent unwinding. To accomplish this end, the fisherman uses one finger of the hand holding the fishing rod for depressing the push member 18, so as to counter the action of the spring means 8. If the push member 18 is released, the spring 17 will cause the line arrester 15 to be moved to the right, but the spool holder will not move since the cam member 7 is engaged by the chock 9.

This is the casting position in which the line under the weight of its baited end is free to unwind.

When it is desired to wind-in the line, the fisherman rotates the hand crank and by virtue of the thrust exerted by the spring means 8, the cam member 7 displaces the chock 9 radially outward, and thus causes the pick-up pin 10 to protrude from the flyer 20. At the same time, cross-stud 6 causes the spool-holder to rock about the spindle 2, and the reel is now in the position shown in FIG. 4. However, this rocking movement effects meshing of the gear wheel 24 with the pinion 47, so that the spool is driven in a geared-down relation, and as illustrated, the direction of rotation is opposite to that of the pinion 47.

The line which is caught by the pick-up pin 10 then winds onto the spool, while the spread required to assure a "honeycomb" pattern can be obtained by the two conjugated rotational movements, as in the prior art.

If the pull exerted by the fish becomes too great, the spool can play out some line by virtue of the rotation of the crown gear 39 which is merely friction driven. When the winding-in operation is completed, and it is desired to cast again, the spool is returned to the FIG. 1 position by depressing the push member 18.

The invention is not to be confined to the precise details illustrated and described, but changes or modifications may be made therein, so long as such changes or modifications mark no material departure from the spirit and scope of the appended claims.

What I claim is:

1. In a fishing reel device including a spool arranged to hold a line and mounted for free delivery of the line therefrom substantially axially of the spool in the casting position, a rotatable pick-up device disposed on the delivery side of the spool and means to impart relative rotation to said spool and to said pick-up device, the improvement comprising means rockably mounting the spool and manually operable means adapted to be operably coupled to the mounting means to rock said spool from a casting position in which said spool is coaxial with the axis of rotation of said rotatable pick-up device to a reeling-in position at an angle with respect to said axis of rotation.

2. In a fishing reel device including a spool arranged to hold a line and mounted for free delivery of the line therefrom substantially axially of the spool in the casting position, a rotatable pick-up device disposed on the delivery side of the spool, and means to impart relative rotation to said spool and to said pick-up device, the improvement including a casing, a spool-holder rockably mounted on said casing, the spool being rotatably mounted on said spool-holder, and manually operable means adapted to be operably coupled to the spool holder to rock said spool-holder from one position in which the spool is coaxial with the axis of rotation of said rotatable pick-up device constituting the casting position to a position at an angle with regard to said axis of rotation constituting the reeling-in position.

3. In a fishing reel device including a spool arranged to hold a line and mounted for free delivery of the line therefrom substantially axially of the spool in the casting position, a rotatable pick-up device disposed on the delivery side of the spool and means to impart relative rotation to said spool and to said pick-up device, the improvement including a casing, a spool-holder rockably mounted in said casing, said spool-holder having a central aperture, the spool being rotatably mounted on said spool-holder, the pick-up device having a rotatable shaft traversing freely said aperture, and manually operable means adapted to be operably coupled to the spool-holder to rock said spool-holder from one position in which said spool-holder and said shaft are coaxial to a second position at an angle relatively to the first-named position, said means to impart relative rotation to the spool and pick-up device including gear means operatively connected with said spool and said rotatable shaft when the spool-holder is in said second-named position.

4. In a fishing reel device including a spool arranged to hold a line and mounted for free delivery of the line therefrom substantially axially of the spool in the casting position, a rotatable pick-up device disposed on the delivery side of the spool and means to impart relative rotation to said spool and to said pick-up device, the improvement including a casing, a spool-holder rockably mounted in said casing, the spool being rotatably mounted on the spool-holder, the pick-up device having a rotatable hollow shaft passing through the spool holder, a second shaft slidably mounted in said hollow shaft, a manually operable member including a first portion adapted to be operably connected to said spool holder to rock said spool holder from one position in which the spool holder and hollow shaft are coaxial and constituting the casting position to a second position at an angle relative to the first-named position and constituting the reeling-in position, said casing having an aperture therein through which the line from the spool is adapted to pass, a line arrester on said second shaft adapted to cooperate with said casing and said aperture for trapping the line passing through said aperture when the spool holder is in the first-named position for preventing the inadvertent unwinding of the line, means normally urging the line arrester away from said aperture and said manually operable member including a second portion adapted to move said second shaft and said line arrester to trap the line against the action of the means normally urging the line arrester away from said aperture.

5. In a fishing device as set forth in claim 4, in which said pick-up device comprises a flyer shell mounted at the end of the hollow shaft on the delivery side of the spool, a ring surrounding said aperture, and said line arrester being a headed portion mounted on the end of said second slidable shaft and cooperating in pressing engagement with the ring when said second portion of said manually operable member moves said second shaft and line arrester to trap the line.

6. In a fishing reel as set forth in claim 4, in which said pick-up device includes a flyer shell having a flange provided with an aperture, said shell being mounted on the hollow shaft on the delivery side of the spool, a line pick-up finger mounted on said shell for radial movement relative to said shell so as to protrude out of said aperture in the flange, and means operably connected to said pick-up finger operative when the spool holder is in said second position for causing said pick-up finger to protrude from said flyer shell.

References Cited in the file of this patent

UNITED STATES PATENTS

| | | |
|---|---|---|
| 2,549,029 | Stalder | Apr. 17, 1951 |
| 2,622,823 | Tlustos | Dec. 23, 1952 |

FOREIGN PATENTS

| | | |
|---|---|---|
| 889,493 | France | Oct. 4, 1943 |
| 894,624 | France | Mar. 20, 1944 |
| 581,574 | Great Britain | Oct. 17, 1946 |